United States Patent [19]

Milden et al.

[11] 4,283,844
[45] Aug. 18, 1981

[54] METHOD OF MAKING BATTERY ELECTRODE STRUCTURE

[75] Inventors: Martin J. Milden, Los Angeles; Stanley Gordon, Torrance, both of Calif.

[73] Assignee: Hughes Aircraft Company, Calif.

[21] Appl. No.: 66,989

[22] Filed: Aug. 16, 1979

[51] Int. Cl.³ ............................................. H01M 4/04
[52] U.S. Cl. ....................................... 29/623.5; 29/2; 429/241; 430/318; 430/319
[58] Field of Search ................ 29/623.1, 623.4, 623.5, 29/2; 429/233–241; 430/318, 319

[56] References Cited

U.S. PATENT DOCUMENTS

| | | | |
|---|---|---|---|
| 3,508,984 | 4/1970 | Travis | 430/319 |
| 3,532,545 | 10/1970 | Babusci et al. | 429/241 |
| 3,700,418 | 10/1972 | Mayeda | 29/156.8 H |
| 3,926,671 | 12/1975 | Gutjahr et al. | 29/623.5 |
| 3,944,434 | 3/1976 | Gröppel et al. | 29/623.5 |
| 4,206,271 | 6/1980 | Norling et al. | 429/235 |

*Primary Examiner*—Daniel C. Crane
*Attorney, Agent, or Firm*—Allen A. Dicke, Jr.; W. H. MacAllister

[57] ABSTRACT

Substrate for nickel-hydrogen battery electrode is etched from nickel sheet metal to provide inner and outer rims 54, 56 for self centering, a tab 62 on which a lead can be welded and properly distributed openings through conductors for optimum ion flow and electric conduction.

6 Claims, 6 Drawing Figures

METHOD OF MAKING BATTERY ELECTRODE STRUCTURE

The U.S. Government has the rights in this invention pursuant to contract no. F33615-75-C-2049 awarded by the Department of Defense.

BACKGROUND

This invention is directed to nickel-hydrogen battery structure, and particularly the method of making both the positive and negative electrodes thereof.

The application is related to patent application Ser. No. 066,987 filed Aug. 16, 1979 by Preston S. DuPont and Howard H. Rogers which is directed to a Battery Electrode Structure, now U.S. Pat. No. 4,250,235, granted Feb. 10, 1981.

In any battery the electric current produced by a change of valence state must be electrically conducted to the battery terminals. Electrical resistance loss in this conduction both adds heat to the battery and reduces the cell voltage to reduce cell efficiency. Therefore conductivity paths must be maximized to minimize electrical resistance. However, ion transfer through the cell requires liquid continuity through the cell stack so that maximized open area is required to maintain adequate ion transfer for optimized cell conduction. In order to achieve these two objectives, open areas are provided in the electrode substrate. Expanded mesh screen has previously been used for hydrogen electrode substrates and woven wire mesh has been used for negative, nickel hydroxide electrode substrate in nickel-hydrogen batteries. One manufacturer makes such electrode substrates from punched metal foil to provide a uniform geometry of equal diameter punched holes.

Sometimes the punched metal foil may be nickel plated iron which will corrode and may degrade the battery performance. The punched holes are circular, and thus provide no optimum relationship between the generally radially directed conduction and the open area for ion passage in a direction perpendicular to the electrode.

Both the expanded mesh electrode substrate and the woven wire screen electrode substrates can cause cell short circuits because the wire-like substrate strands at the edges of the substrate can extend and make contact where such contact is undesirable. This is one disadvantage of the prior art construction. The pressure vessel which contains the electrodes and the electrolyte is cylindrical through the central portion thereof and has hemispherical domes on the ends to contain the internal pressure. When there is a change in temperature of the system the clearance between the electrodes and the outer wall changes. When the electrodes have wire screen substrates, then the radial clearance is a problem. However, the solid outer rim construction of the electrode substrate, in accordance with this invention, allows precise minimum clearance between the electrodes and the cylindrical center section of the pressure vessel, which was not possible with the prior art woven wire substrate.

Furthermore, the woven screen wire construction of the prior art has wires in two directions which are substantially normal to each other. This construction provides difficulty in the current path, to result in non-uniform current density through the electrode substrate to result in higher electrical losses and less electrode utilization. With properly designed etched foil electrode substrates in accordance with this invention, there is lower electrical losses as compared to the same weight electrodes of other construction. Thus, the battery designer can achieve a lower weight battery with the same electrical performance, or a battery of the same weight with higher efficiency, by use of the concepts of this invention. Additionally, the incorporation of a shape substrate which is self-edged with both interior and exterior rims can reduce manufacturing operations and thus reduce cost.

SUMMARY

In order to aid in the understanding of this invention it can be stated in essentially summary form that it is directed to the method of making electrodes for a nickel-hydrogen battery wherein the electrodes have an electrode substrate etched in the desirable pattern for electrical conduction and ion passage.

It is thus an object of this invention to provide a method for making a nickel-hydrogen battery electrode of optimum configuration. It is another object to provide a hydrogen battery having an electrode structure made in accordance with this method wherein ion transfer normal to the electrode surface is functionally balanced with optimum electrical conduction radially in the conductive electrode substrate. It is a further object to provide a method for making an etched nickel-electrode substrate for a nickel-hydrogen battery wherein the electric current conduction paths are of optimim configuration for electrical purposes, to provide for maximized battery efficiency.

Other objects and advantages of this invention will become apparent from a study of the following portion of this specification, the claims and the attached drawings.

DESCRIPTION OF THE PREFERRED EMBODIMENT

Figure 1:
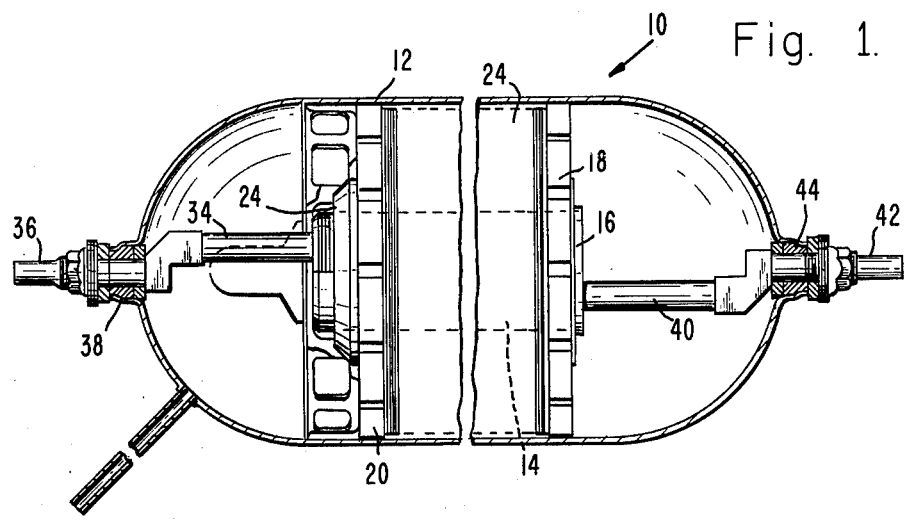
FIG. 1 is a side elevational view of a nickel-hydrogen battery, with the housing partly broken away to show the electrode stack and its assembly structure and leads as assembled therein.
Figure 2:
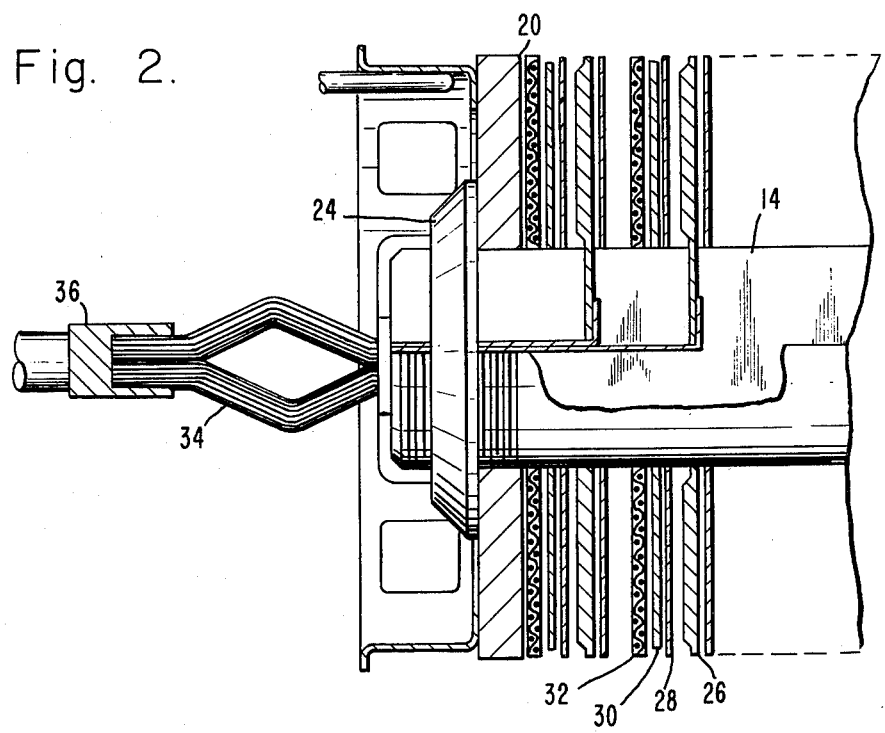
FIG. 2 is an enlarged detail of one end of the electrode stack, showing the stack relationship.

Nickel-hydrogen battery 10 is illustrated in side elevation, with the cylindrical shell of housing 12 partly broken away to show the internal structure. Central support tube 14 has a flange 16 at its right end upon which end plate 18 is engaged. On the other end, end plate 20 is engaged by nut 22 which is threadedly engaged on the left end of central support tube 14. Stack 24 of electrodes and separators is engaged and clamped between end plates 18 and 20. There are four parts to the repetitive assembly. As seen in FIG. 2, the repetitive stack set comprises positive electrode assembly 26, separator 28, negative electrode assembly 30 and gas screen 32. There is a plurality of the repetitive stack sets, and special or partial sets may be provided at each end against the end plates. Leads 34 are attached to each positive electrode assembly and extend to the left. They are assembled in terminal 36 which extends out of housing 12 through insulator bushing 38. Terminal 36 provides the external positive connection to the battery. Similarily, the negative electrode assemblies 30, see FIG. 5, each have a lead 40 thereof. The leads 40 to the negative electrodes 30 are assembled and brought together up central support tube 14 and are secured in the end in terminal 42. Terminal 42 extends out of housing 12 through insulator bushing 44 to act as an external negative terminal connection of battery 10.

Figure 3:
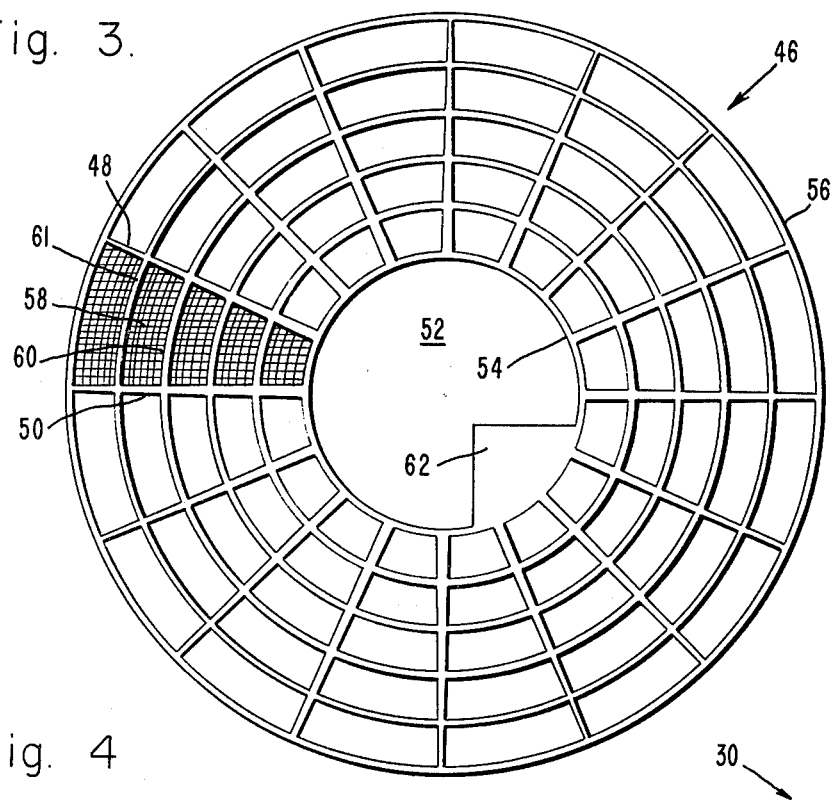
FIG. 3 is a plan view of the etched electrode substrate structure used in the method of this invention.
Figure 4:
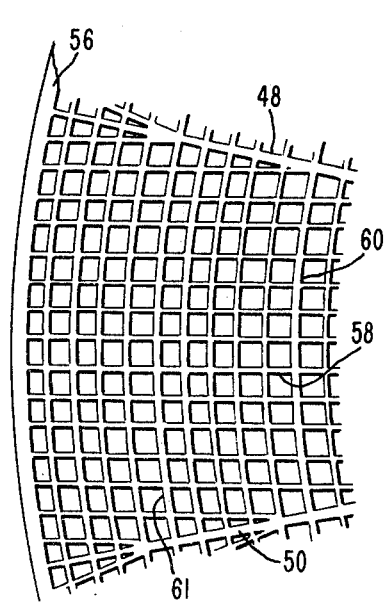
FIG. 4 is an enlarged detail, with parts broken away, of the substrate used in the method of this invention.
Figure 6:
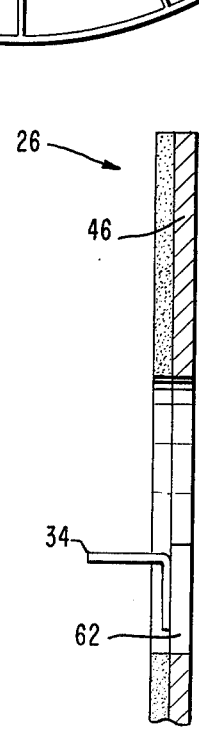
FIG. 6 is a centerline section through a positive electrode, showing the layer on the electrode substrate applied in accordance with this invention.

Negative electrode assembly 30 shown on FIG. 4 is comprised of an etched nickel substrate 46 which is shown in side elevation in FIGS. 3 and 4. In the specific example, substrate 46 is electrochemically etched from nickel sheet material 0.003 inches (0.008 centimeters) thick. It is etched with a pattern which has radially extending conductors two of which are shown at 48 and 50. The inner opening 52 is defined by ring 54 and the outer diameter of substrate 46 is defined by ring 56. The truncated pie shaped piece thus defined between radial conductors 48 and 50, and inner and outer rings 54 and 56 are is provided with a grid mesh. The grid mesh has inwardly directed bars 58. These are parallel to each other and the center one is radially directed. Circumferential connectors, two of which are shown at 60 and 61, interconnect the inwardly directed bars 58 with respect to radial conductors 48 and 50 to give them strength.

The structure is designed with radial conductors 48 and 50 of tapered configuration with greater width and cross sectional area closer to the center. The current is fed toward the center and in order to maintain approximately constant current density through the metal of substrate 46, and particularly the radial conductors 48 and 50, the radial conductors are thus tapered to be more broad in the inward direction. The grid work defined by the inwardly directed bars 58 and circumferential connectors 60 has an open area of 70 percent. Tab 62 is unetched. It is solid metal and is used for attachment of the current leads.

In addition to the feature of balancing the electrical conductivity needs and the ion transparency, the etched electrode substrate also provides the important advantage of having self-edging in the form of inner and outer rings 54 and 56. These rings are free of burrs and protrusions to minimize the chance of short circuits. Additionally, the etched metal electrode substrate has the tab 62 which serves as an integral solid section for external connection. Tab 62 also interacts with central support tube 14 to index the electrodes into the correct angular orientation and hold them in that angle.

The use of a flat sheet of metal as the starting material for the etched electrode makes for a more uniform, flatter substrate. The flatness is important because the thinner the electrode the more electrodes can be stacked onto a central support tube 14 of a particular length. The prior art woven screen fabric resulted in a thicker substrate; with 0.003 inch diameter wire, the woven structure becomes 6 mils thick.

The inwardly directed bars 58 of the substrate grid serve as electric conductors, in addition to the main radial conductors 48 and 50. Many of the inwardly directed conductor bars 58 engage into the radial conductors 48 and 50. This arrangement provides more uniform current density in the active material deposited on the substrate.

Figure 5:
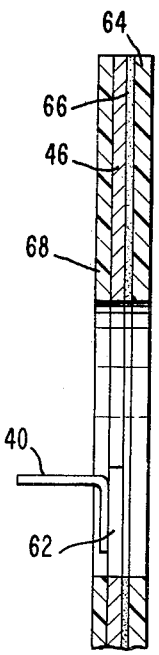
FIG. 5 is a centerline section through the negative electrode, showing the layers on the electrode substrate applied in accordance with this invention.

Referring to FIG. 5, the negative electrode 30 is built up on substrate 46. On the right hand side is attached a disc 64 of "Teflon" brand of polytetrafluoroethylene. It is attached by "Teflon" adhesive 66. Disc 64 is porous for ion transfer. The electrically active coating 68 is a mixture of platinum powder, "Methocel" and "Teflon" brand of small polytetrafluoroethylene fibers. "Methocel" is a water solution of hydroxy propylmethyl cellulose. Disc coating 68 is applied to the side of etched nickel substrate 46 opposite teflon disc 64. It is evenly applied, as by silk screening or depositing-leveling and thereupon negative electrode assembly 30 is sintered by slow heating to 635° F. in one hour and thereafter holding at that temperature for ten minutes. From the sintering temperature, the electrodes are allowed to slow cool in the furnace.

The positive electrode 26 is loaded with nickel-hydroxide in the sintered nickel power on the substrate. The convenient and preferred way of depositing the nickel-hydroxide in the pores of the nickel sintered structure is to soak the positive electrodes 26 in nickel nitrate in water solution and passing current therethrough to generate OH$^-$ ions which combine with the Ni$^{++}$ ions in solution precipitating Ni(OH)$_2$ in the pores of the electrode. It is thought that the generation of gas during the deposition keeps the paths open so that a larger area of nickel-hydroxide is available to the electrolyte in the finished cell.

Leads 34 and 40 are attached to the electrodes and the electrodes with their separators are stacked in repetitive stack sets of positive electrode assembly 26, separator 28, negative electrode assembly 30 and gas screen 32. A plurality of these stacks is assembled onto central support tube 14 with the leads of the individual electrodes assembled through an external recess in central support tube 14. Upon final assembly, the central support tube is assembled into housing 12.

The electrolyte is a water solution of potassium hydroxide and the chemical reaction which produces the electrons is the change in valence of the nickel-hydroxide in the positive electrode between the two and three valence states. The simplified reaction at the positive electrode can be represented as:

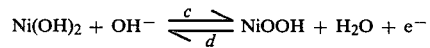

Similarily a simplified illustration of the reaction at the negative electrode is:

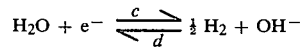

There is a change in gas pressure in the housing 12, and for this reason the housing must be sufficiently strong to withstand about 800 PSIG.

There are several advantages in the nickel-hydrogen battery which result from the particular electrode structure. These advantages include a shorter current path through the conductors on the substrate with an attempt to maintain constant current density and maintain maximum open area through the substrate. This reduces the electrical resistance and reduces the weight of metal needed so that optimum weight advantage is achieved.

In addition, ragged edges on the substrate are eliminated because solid rims can be maintained both on the inside and the outside of the substrate, see rims 54 and 56 in FIG. 3. In addition, the solid tab 62 is provided by the etching. This tab cannot be achieved with wire mesh substrates. The welding of tabs onto the prior art wire mesh substrates presented a non-uniform current distribution and a less reliable interconnection with a larger voltage drop, as compared to the solid tab 62 of the present electrode substrate. The presence of the tab reduces manufacturing time because of the convenience of welding leads 34 and 40 thereto. The ragged edges on previous substrates caused short circuits in the battery. Furthermore, the inner ring 54 provides self-centering on the center tube 14, with the solid tab 62 providing rotary indexing of the electrodes, together with locking them into rotational position.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. The method of making a self-supporting electrode substrate for a nickel-hydrogen cell comprising the steps of:

coating nickel sheet metal with a photoresist;

exposing the photoresist in accordance with a desired electrode pattern to leave a solid outer rim around the electrode substrate, to leave a solid inner rim within said electrode substrate with an inner opening interiorly of the inner rim toward the center of the electrode substrate and with a tab positioned on the inner rim, together with radially directed conductors attached to the inner rim and to the outer rim and being of greater cross-section closer to the inner rim than to the outer rim to reduce electrical resistance drop as current moves through the radial conductors with respect to the inner rim;

chemically etching away through the nickel to form a nickel substrate having perforations therethrough in accordance with the photoresist pattern to provide ion flow paths perpendicular to the conductors.

2. The method of claim 1 further including the step of:

welding a lead onto the tab.

3. The method of making an electrode for a nickel-hydrogen cell comprising the steps of:

coating nickel sheet metal with a photoresist;

exposing the photoresist in accordance with a desired electrode substrate pattern to leave a solid outer rim around the electrode substrate and a solid inner rim within the electrode substrate with an inner opening within the inner rim and to leave a plurality of substantially radially directed conductors connected to both the inner and outer rim, chemically etching away through the nickel sheet to form a self-supporting nickel substrate having perforations therethrough;

sintering nickel powder on one side of the etched metallic nickel substrate having openings therethrough so that the sintered nickel is porous; and depositing nickel-hydroxide in the porous sintered nickel to form a positive electrode for a nickel-hydrogen battery.

4. The method of making an electrode for a nickel-hydrogen cell comprising the steps of:

coating nickel sheet metal with a photoresist;

exposing the photoresist in accordance with a desired electrode substrate pattern to leave a solid outer rim around the electrode substrate and a solid inner rim within the electrode substrate with an inner opening within the inner rim and to leave a plurality of substantially radially directed conductors connected to both the inner and outer rim;

chemically etching away through the nickel sheet to form a self-supporting nickel substrate having perforations therethrough;

adhesively securing a porous teflon layer on one face of the self-supporting etched nickel substrate with etched openings therethrough.

5. The method of claim 4 further including the steps of:

sintering a mixture of platinum powder and Teflon on the other face of the etched nickel substrate having openings therethrough so as to form a negative electrode for a nickel-hydrogen battery.

6. The method of making an electrode for a nickel-hydrogen cell comprising the steps of:

coating nickel sheet metal with a photoresist;

exposing the photoresist in accordance with a desired electrode substrate pattern to leave a solid outer rim around the electrode substrate and a solid inner rim within the electrode substrate with an inner opening within the inner rim and to leave a plurality of substantially radially directed conductors connected to both the inner and outer rim;

chemically etching away through the nickel sheet to form a self-supporting nickel substrate having perforations therethrough;

depositing electro-chemically active material on said electrode substrate; and assembling a plurality of said coated substrates onto a central support tube positioned within the metallic rim so that the plurality of coated electrode substrates is centered on and supported on the central support tube.

* * * * *